US008887150B2

(12) United States Patent
Matenaar et al.

(10) Patent No.: US 8,887,150 B2
(45) Date of Patent: Nov. 11, 2014

(54) METHODS FOR DYNAMIC MOBILE APPLICATION BEHAVIOR MODIFICATION SUBJECT TO A BEHAVIOR POLICY

(71) Applicants: Felix Matenaar, San Francisco, CA (US); Patrick Schulz, San Francisco, CA (US)

(72) Inventors: Felix Matenaar, San Francisco, CA (US); Patrick Schulz, San Francisco, CA (US)

(73) Assignee: Bluebox Security Inc., San Francisco, CA (US)

( * ) Notice: Subject to any disclaimer, the term of this patent is extended or adjusted under 35 U.S.C. 154(b) by 0 days.

(21) Appl. No.: 14/205,732

(22) Filed: Mar. 12, 2014

(65) Prior Publication Data

US 2014/0282465 A1   Sep. 18, 2014

Related U.S. Application Data

(60) Provisional application No. 61/778,164, filed on Mar. 12, 2013.

(51) Int. Cl.
*G06F 9/45* (2006.01)
*G06F 9/445* (2006.01)

(52) U.S. Cl.
CPC ..................................... *G06F 9/445* (2013.01)
USPC ........................................... 717/172; 717/177

(58) Field of Classification Search
CPC ....... G06F 7/67; G06F 9/45504; H04W 4/001
USPC ........................... 717/172, 177; 719/331–332
See application file for complete search history.

(56) References Cited

U.S. PATENT DOCUMENTS

| 6,886,157 | B2 * | 4/2005 | Long et al. ..................... 717/151 |
| 2003/0051233 | A1 * | 3/2003 | Krishna et al. ................. 717/136 |
| 2008/0134154 | A1 * | 6/2008 | Patel et al. ..................... 717/139 |
| 2010/0306759 | A1 * | 12/2010 | Kohler et al. .................. 717/174 |
| 2014/0089907 | A1 * | 3/2014 | Cabillic et al. ................. 717/147 |

* cited by examiner

*Primary Examiner* — Ryan Coyer
(74) *Attorney, Agent, or Firm* — Dennemeyer & Associates, LLC (57) ABSTRACT

The present invention provides a mechanism to change how mobile device applications, particularly Android applications, work; essentially selectively modifying their behavior. Where an application provides a useful operation but also has functionality that can be detrimental to the desired action of a device, use of the application becomes problematic. The present invention provides a method of modifying the use of the application without invasive reprogramming of the code. The present invention provides a means to make modifications to the functionality without modifying the application. As a result, performance of the desired outcome is not affected and because there is no modification of the actual software, legal boundaries are maintained.

8 Claims, 5 Drawing Sheets

METHODS FOR DYNAMIC MOBILE APPLICATION BEHAVIOR MODIFICATION SUBJECT TO A BEHAVIOR POLICY

CROSS-REFERENCES TO RELATED APPLICATIONS

The present application is a continuation of (provisional) Application No. 61778164; filed on Mar. 12, 2013, the full disclosures of which is incorporated herein by reference.

FIELD OF THE INVENTION

The present invention relates to mobile device software. More particularly, the present invention relates to methods for dynamically changing the behavior of a software application running on a mobile device and a mobile device programmed to implement such behavior.

BACKGROUND OF THE INVENTION

In the normal course of the use of a mobile application, a user may find that an application has functionality that is appropriate to the tasks at hand and that it also has functions that are problematic to one or more needs of the user or his/her environment. An application that is excellent for doing one tasks so burdens or exposes information, data or a secondary task, through its normal operation that it unfortunately cannot be used to perform the desired task.

The programmer of a typical mobile software application may purposefully or erroneously introduce software logic that could embody a behavior considered to be undesirable by the owner of the mobile device executing the software application, or another related third-party such as an employer of the owner of the mobile device. An example of undesirable behavior would be to upload and disseminate the mobile device owner's personal information (stored on the mobile device) to unauthorized websites, causing a privacy concern. Another example of undesirable behavior would be an application that downloads data deemed to be confidential or sensitive by a third-party (such as a corporation), and then storing that sensitive data to a persistent storage medium, without proper security controls such as encryption. Other examples of unexpected and unwanted consequences are well known to persons having ordinary skill in the art.

In such cases the application might be abandoned by the user as too much trouble to use. Further, the prior answer to such situations often included an attempt to rewrite the application software so that the application would act in the manner desired and limit undesired aspects. Such attempts have led to applications having unexpected functionality, being dysfunctional or "buggy", and raising accusations of infringement or license violations.

It will be understood then, that while available applications can provide useful functionality, the addition of unexpected consequences in the package that makes up the software can cause such applications to become more harmful than useful. It would therefore be desirable to be able to modify the environment in which the desired but problematic application resides so as to allow it to function in the ways desired; shut down functions and actions that are undesirable all while maintaining the integrity of the application so as not to cause additional unexpected results or violate or infringe intellectual property rights and licenses therein. In such an environment the application could function either unaware of the change in its behavior or aware that its actions have changed without consequence to the application and without crossing boundaries of intellectual property ownership and licensing oversteps.

Other objects and advantages of the present invention will become apparent as the description proceeds.

SUMMARY OF THE INVENTION

In accordance with the present invention a computer-implemented method for modifying execution of a software application on a mobile computing device programmed to perform the method is provided. The method includes the steps of receiving in the mobile computing device the software application having a plurality of logical software instructions and also receiving a software library comprising a plurality of modified logical software instructions. The method calls for the execution of the software application while inhibiting execution of the plurality of logical software instructions and initiating execution of the plurality of modified logical software instructions. In embodiments of the invention the software library instructions perform operations specified by a behavior policy created by the user and implemented in the device.

In embodiments of the present invention the method can further include modifying a virtual machine in the mobile computing device to refer to the plurality of modified logical software instructions provided. In such situations the virtual machine could be an Android Dalvik Virtual Machine. Other types and examples of virtual machines can be substituted by persons having ordinary skill in the art without departing from the novel scope of the present invention. In these embodiments the software library comprises a native code library. In addition, execution of the software application includes modifying a reference from the logical software instructions to now refer to the modified logical software instructions. This modification is done by determining a pointer, to an Insns field in a Method Object in the virtual machine, and modifying the pointer to point to the desired software library.

In addition, the modifying to the modified logical software instructions can be done by determining in the mobile computing device, a pointer to a NativeFunc field in a Method Object in a virtual machine; modifying the pointer to point to the software library; determining a pointer to an AccessFlags field in a Method Object in a virtual machine; and modifying the pointer to include the ACC_NATIVE logical value. In such embodiments, the method can further comprise steps to determining a pointer to an Insns field in a Method Object in a virtual machine and construct a second Method Object. The method would then copy the pointer of the Insns field of the Method Object to the second Method Object and modify the pointer to the Insns field.

For the implementation of the invention the mobile computing device used to modify execution of a software application would include a memory, to store a software application that includes a plurality of logical software instructions and also store a software library having modified logical software instructions. The mobile computing device would also have a processor, associated with the memory, programmed to initiating execution of the software application and programmed to inhibit execution of the plurality of logical software instructions when executing the software application. In addition the processor would be programmed to initiating execution of the plurality of modified logical software instructions when executing the software application.

In one embodiment, a computer-implemented method for modifying execution of a software application on a computing system programmed to perform the method is provided. The method includes the steps of transforming the software application to include a software library; determining execution start points of the software application and modifying the software application instructions referenced by the execution start points to execute instructions in the software library. Determining execution start points of the software application, and include determining one or more data values within an AndroidManifest.xml file. The data values can be found in one or more of: an Intent, an Activity, a BroadcastReceiver, a ContentProvider, and/or a Service. Execution start points of the software application, can include determining in the computing system, the "android:name" data value within an AndroidManifest.xml file A more detailed explanation of the invention is provided in the following description and claims and is illustrated in the accompanying drawings.

DETAILED DESCRIPTION OF THE ILLUSTRATIVE EMBODIMENT

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

The present invention is mostly direct to Android based systems. Google™ Android™-based mobile computing devices, such as mobile telephones, smart phones, smart televisions, infotainment systems, tablets, smart watches, and wearable computing devices, currently represent significant world-wide mobile device market presence exceeding one billion mobile computing devices. Google Android-based mobile computing devices, also referred to as Android devices or Android compatible devices, include devices running Google Android operating system, Android Open Source Project (AOSP) operating system, an Android compatible operating system, an operating system derived from or utilizing substantial parts of the AOSP operating system, an operating system derived from or utilizing AOSP application runtime components, and an operating system advertising Android application compatibility, among others. Example Android-based operating systems and Android compatible operating systems included Amazon™ Kindle™ Fire OS™, Mozilla™ Firefox OS™, Blackberry™ OS, Baidu Yi™, Xiaomi™ MIUI, Tizen™, and Cyanogenmod™, among others. It will be understood that persons having ordinary skill in the art may use the method of the present invention in other operating systems, or within environments created in other operating systems, without departing from the novel scope of the present invention; the discussions based on the Android system are meant to be exemplary and not limiting.

Figure 1A:
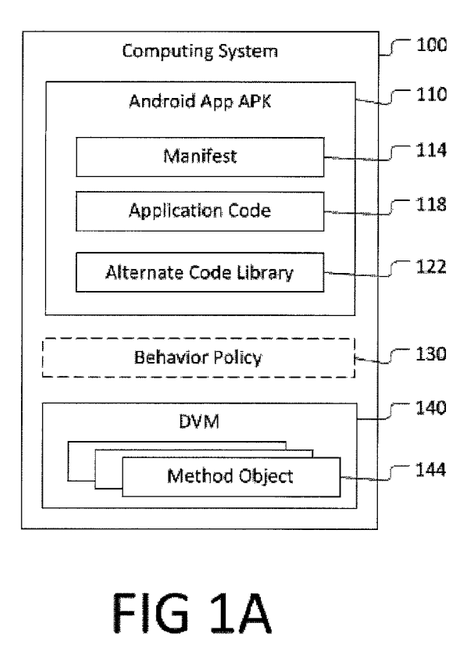
FIG. 1A is a representation of a system using the method of the present invention.

Referring now to FIG. 1A, computing system 100 embodies a memory containing an Android application APK 110. The Android application APK 110 minimally embodies a manifest 114, application code 118, and an alternate code library 122. The Android application APK 110 represented an industry standard Android-compatible application appropriate to execute on an Android-compatible computing system. The manifest 114 represents an industry standard AndroidManifest.xml file common to Android applications. The application code 118 represents an industry standard classes.dex file common to Android applications. The computing system 100 also embodies a Dalvik Virtual Machine (DVM) 140. Within the DVM 140, a plurality of logical method objects 144 exist. An optional set of behavior policy data 130 may be present in the computing system 100 memory.

Figure 1B:
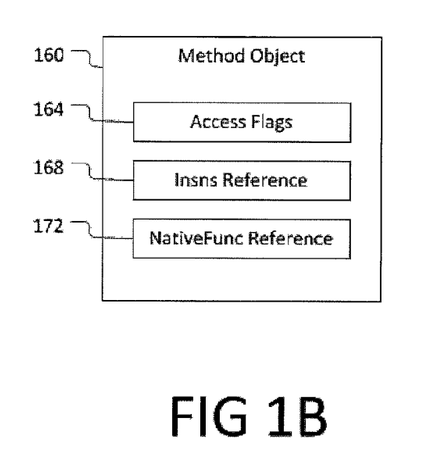
FIG. 1B is another representation of a system using the method of the present invention.

Referring to FIG. 1B, a method object 160 is represented as embodied in the plurality of method objects 144 (FIG. 1A). The method object 160 minimally contains an access flags value 164, an insns (instructions) reference 168, and a nativefunc (native function) reference 172. The definition and embodiment of the method object 160 is typical of the "Method struct" (logical programming structure) typically found within an industry standard Android-compatible Dalvik Virtual Machine.

Figure 2:
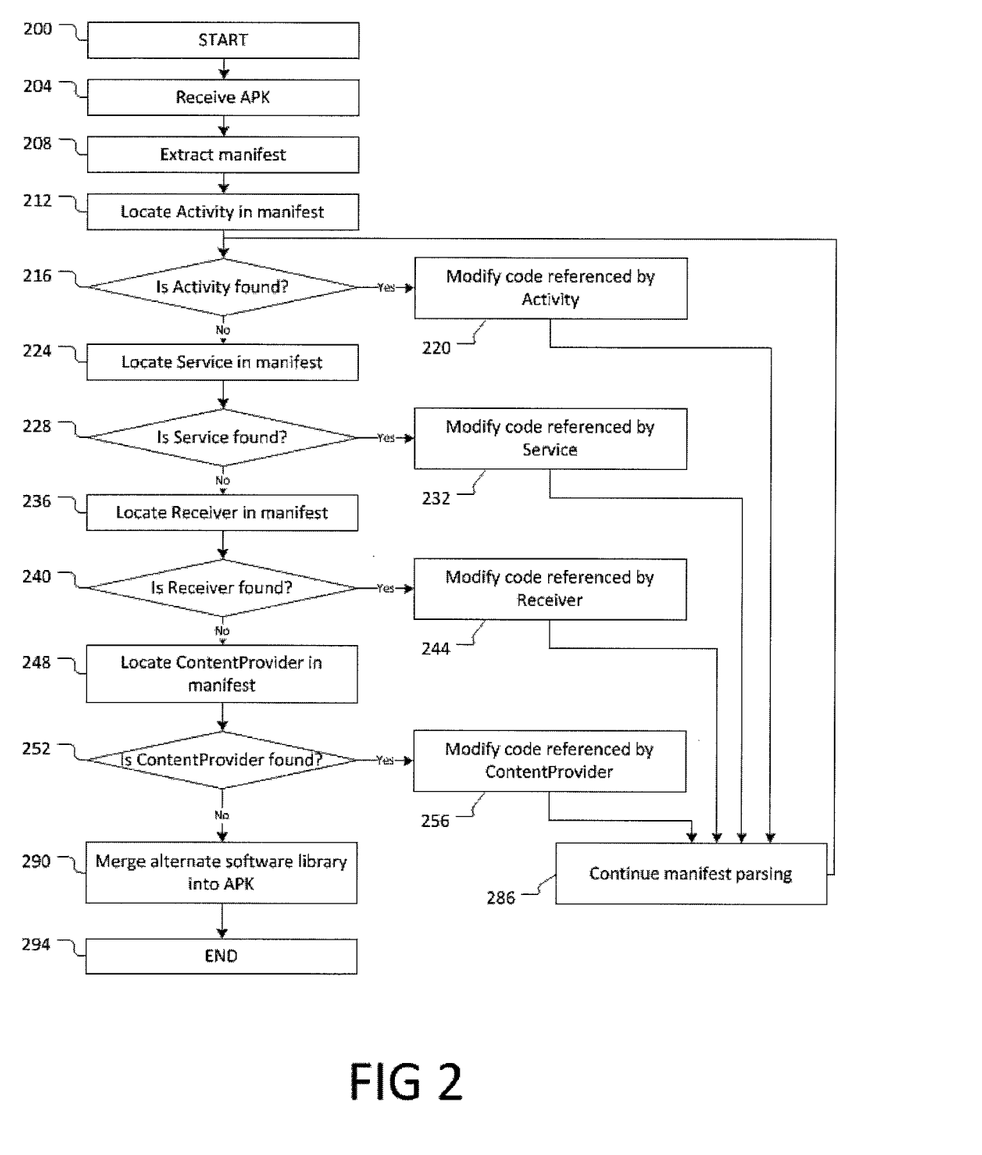
FIG. 2 is a flow chart of the functionality of the present invention.

Now referring to FIG. 2, an illustration of a method to modify an Android application in preparation to execute an application with an alternate software library. The method starts by receiving 204 an Android application APK file. The application manifest is extracted 208. A location search for an Activity 212 is conducted, and if an Activity is found 216, the application code referenced by the Activity is modified 220 to include an execution reference to an alternate software library. The process then continues to parse the manifest 286 to determine if any further Activities are found 216. When no Activities are located 216, a location search for a Service 224 is conducted, and if a Service is found 228, the application code referenced by the Service is modified 232 to include an execution reference to an alternate software library. The process then continues to parse the manifest 286 to determine if any further Services are found 228. When no Services are located 228, a location search for a Receiver 240 is conducted, and if a Receiver is found 240, the application code referenced by the Receiver is modified 244 to include an execution reference to an alternate software library. The process then continues to parse the manifest 286 to determine if any further Receivers are found 240. When no Receivers are located 240, a location search for a ContentProvider 248 is conducted, and if a ContentProvider is found 252, the application code referenced by the ContentProvider is modified 256 to include an execution reference to an alternate software library. The process then continues to parse the manifest 286 to determine if any further ContentProviders are found 252. When no ContentProviders are found 252, the alternate software library is merged 290 into the application APK file, and then the method is concluded 294.

Figure 3:
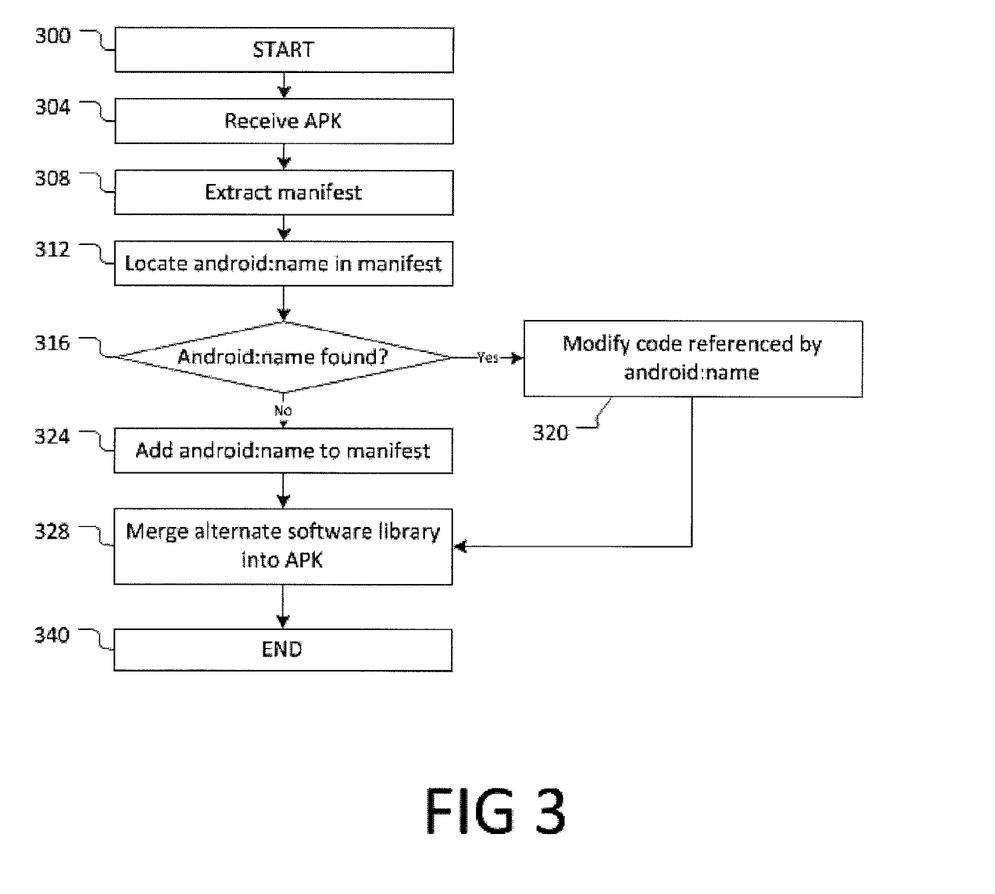
FIG. 3 is a further flow chart of the functionality of the present invention.

Now referring to FIG. 3, an illustration of an alternate method to modify an Android application in preparation to execute an application with an alternate software library. The method starts by receiving 304 an Android application APK file. The application manifest is extracted 308. The manifest is searched 312 for an "android:name" data element. If the "android:name" element is found 316, the application code referenced by the "android:name" element is modified 320 to include an execution reference to an alternate software library. If the "android:name" element is not found 316, a new "android:name" element is added 324 to the manifest, wherein the newly added "android:name" element references code in the alternate software library. The alternate software library is merged 328 into the application APK file, and then the method is concluded 340.

Figure 4:
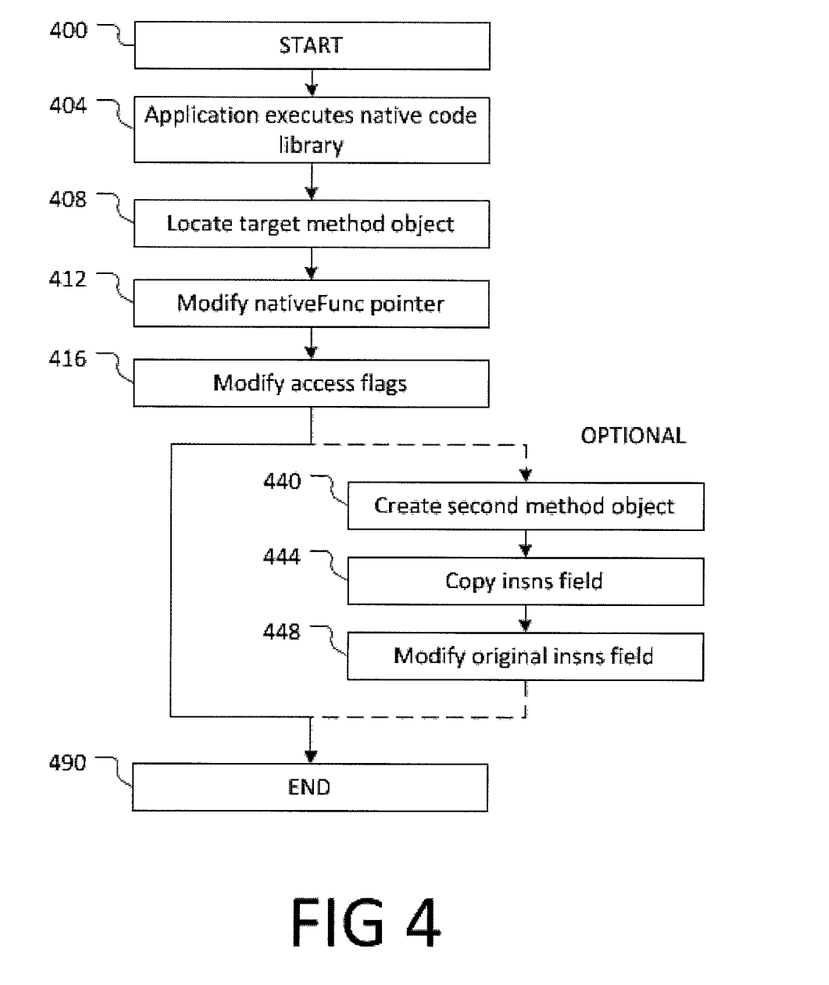
FIG. 4 is a further flow chart of the functionality of the present invention.

Now referring to FIG. 4, an illustration of the method to execute an application with an alternate software library. The method starts 400 with the application executing 404 the logic in the alternate software library 122 (FIG. 1A). The logic in the alternate software library 122 embodies the method to locate 408 in the DVM 140 (FIG. 1A) the method object 144 (FIG. 1A) that represents a predetermined target application logic method. The method then modifies 412 the NativeFunc reference 172 (FIG. 1B) to reference logic in the alternate software library 122. Next, the method modifies 416 the access flags value 164 (FIG. 1B) to set the ACC_NATIVE logic value flag. Wherein, with the modifications made by this method, whenever the application code 118 (FIG. 1A) requests the DVM 140 to execute the logic for the predetermined target application logic method, the DVM 140 will direct execution to the logic in the alternate software library 122 referenced by the NativeFunc reference 172.

Optionally, the method can further create 440 a second method object 160 (FIG. 1B), copy the Insns reference 168 (FIG. 1B) from the original method object to the second method object, and modify the Insns field of the original method object with a reference to the second method object.

Once the method modifies the necessary method object fields, the method is then concluded 490.

Figure 5:
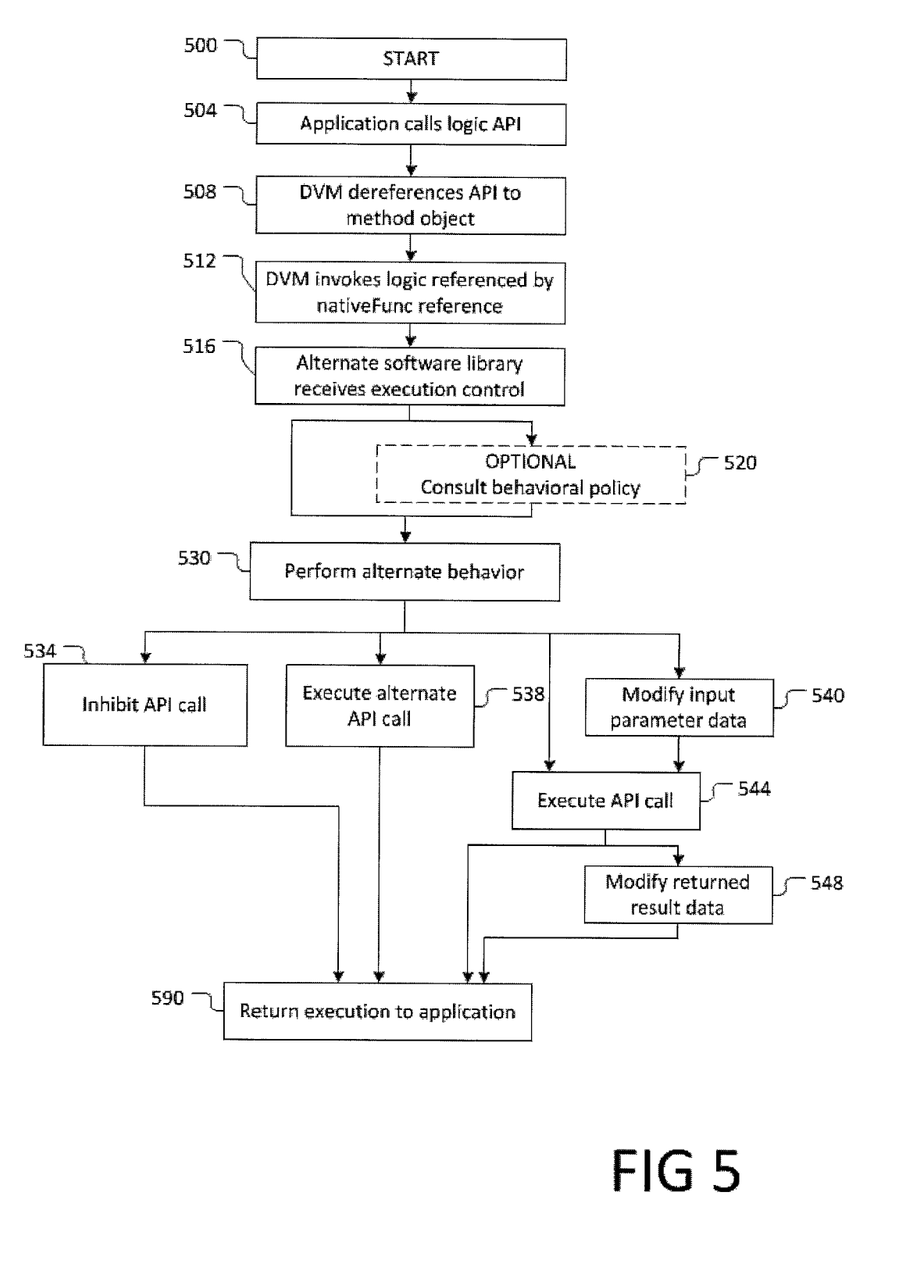
FIG. 5 is a further flow chart of the functionality of the present invention.

Now referring to FIG. 5, an illustration of the method to dynamically modify the execution behavior of an application with an alternate software library. The method starts with the application logic 118 (FIG. 1A) calling 504 a logic API. The DVM 140 (FIG. 1A) facilitates this logic API call by dereferencing 508 the method object 144 (FIG. 1A) that corresponds to the logic API. This method object 144 has been modified with the prior method illustrated in FIG. 4. The DVM 140 access the nativeFunc reference 172 (FIG. 1B) of the method object 144. Due to the prior method of FIG. 4, the nativeFunc reference 172 will reference logic in the alternate software library 122 (FIG. 1A). The DVM 140 will invoke 512 the logic referenced by the nativeFunc reference 172, thus transferring execution to the alternate software library. The alternate software library 122 receives 516 execution control to perform 530 an alternate logic behavior. Optionally, the alternate software library 122 can consult 520 a behavior policy 130 (FIG. 1A) to determine the appropriate alternate logic behavior to perform 530.

As part of performing 530 an alternate behavior, the alternate software library 122 can perform a predetermined behavior, or take direction from a previously consulted 520 behavior policy 130. The alternate software library can choose to inhibit 534 the logic API call, execute 538 an alternate API call, or execute 544 the original API call. Optionally, the alternate software library can modify 540 input parameter data prior to executing 544 the original API call. Optionally, the alternate software library can modify 548 the returned result data from the execution 544 of the original API call. The method concludes by returning 590 execution and any necessary return result data back to the application. Persons having ordinary skill in the art will understand there are many further behaviors that may be appropriate for the alternate software library 122 to perform as part of the behavior modification process; there are further manners where a plurality of behaviors may be created in combination. The use of additional behavior modifications and combinations of approaches is well within the novel scope of the present invention.

In various embodiments, the application is unaware of any changes in behavior; however, the behavior of the application is changed to be consistent with behavior specified by a defined application behavior policy.

Embodiments of the present invention implement a unique method for taking a typical mobile software application that runs on a mobile device, such as utilizing the Android operating system, and modifying the behavior. More specifically in various embodiments, modifications are performed on the mobile software application before the application is initially executed. This modification adds additional behavior modification logic to the application. In operation upon initial startup of a mobile software application, behavior modification logic is executed. In various embodiments, the behavior modification logic consults an application behavior policy that indicates allowed, disallowed, modifiable functionality, or the like. The behavior modification logic then dynamically modifies the underlying mobile software application data structures called by the mobile software application. These modifications may fully change how those application data structures work or operate, but does not necessarily change the original mobile software application. Additionally in various embodiments, these modifications are transparent to the mobile software application and do not indicate to the original mobile software application that a dynamic behavior change has occurred.

Various embodiments of the present invention involve a collection of software logic, known as a "library" in the industry. This library is typically implemented using the direct instructions of the central processing unit of the mobile device, known as a "native library" or "native code library" in the industry. Further, the library contains at least one set of instructions (referred to in the industry as a "function", "software method", or "method"). Functions perform operations upon software logical data values that are a part of a mobile software application execution engine, known as the "Dalvik Virtual Machine" or "DVM" in the industry. Further discussion of those logical data values and operations are provided below. This library herein is referred to as the "alternate logic software library."

In various embodiments, as mentioned above, modifications are made to the original mobile software application. In some embodiments, the mobile software application is modified to include the alternate logic software library. In some embodiments, the modifications involve transforming the software logical operations, known as the "binary code" or "code" in the industry. As a result of the modification to the original mobile software application, the mobile software application will transfer execution to the software instructions in the alternate logic software library.

In various embodiments, there are multiple methods and variants on how to perform the modification. In light of the present disclosure, one of ordinary skill in the art will recognize many other methods are available or possible within other embodiments of the present invention without departing from the novel scope thereof. Two examples of this modification process are provided below.

In one embodiment, a method of modification initially involves performing an enumeration of the mobile software application points of execution start. Next, for each identified point of execution start, embodiments modify the mobile software application instructions at that point of execution start. This modification causes an execution of software instructions in the software library.

In one example, the mobile software application points of execution start can be determined by first parsing the Android "AndroidManifest.xml" file included with the mobile software application. In this file, these points of execution start include some or all of the "Activities", "BroadcastReceivers", "ContentProviders", and "Services." Next in this example, the method includes identifying all the mobile software application instruction code locations for these identified Activities, BroadcastReceivers, and Services. Subsequently, the method then modifies the instruction code at those locations to transfer execution to software instructions in the alternate logic software library.

In another example, the mobile software application points of execution start can be determined by first parsing the Android application "AndroidManifest.xml" to identify the "android:name" value of the "application" XML element. If the "android:name" value exists and contains a valid value, then the software instruction code location (location value) referenced by the "android:name" is identified. Subsequently, the location value is modified to redirect the execution of software instructions to the alternate logic software library.

In various embodiments, if the "android:name" value does not exist or does not contain a valid value, then a new software code location is created that references software instructions in the alternate logic software library. Subsequently, a reference value to the new software code location is copied into the "android:name" value, and the modified "AndroidManifest.xml" is substituted for the original "AndroidManifest.xml."

In various embodiments, the modification procedures may be performed on the destination mobile device or may be performed on a system external to the mobile device before the mobile software application is copied or otherwise transported to the intended destination mobile device, or the like.

In operation, the modified mobile software application is run on the mobile device, causing the mobile device central processing unit and other supporting hardware to execute the mobile software application instructions. Through the previous mentioned modification process, the modified mobile software application transfers execution to at least one set of instructions found in the alternate logic software library, mentioned above. In various embodiments, the provided alternate logic software library software instructions embody one or more methods to modify logical data values in the Dalvik Virtual Machine (DVM).

In various embodiments, the particular operation of the provided alternate logic software library software instructions may be variable and directed by a collection of meta-data, called a "behavioral policy" or "policy". The policy typically includes information indicating for example: what storage locations or software methods of the original mobile software application to modify, the behavior of the new modification, a set of new software instructions to execute, etc. In light of the present disclosure, persons having ordinary skilled in the art will recognize that the policy meta-data and consultation/interpretation, by the provided alternate logic software library software instructions, can be implemented in virtually any conventional manner without departing from the novel scope of the present invention.

In various embodiments, the policy meta-data can be provided to the destination mobile device in many ways: it can be copied over a network from a remote entity on the network to the mobile device, it can be included in the mobile software application modifications previously discussed, it can be embedded or fully contained within the library software instructions, it can be referenced from a location on a local persistent storage medium, or the like. Persons having ordinary skill in the art will be able to contemplate many additional methods for providing policy meta-data to the destination mobile device that are within the novel scope of the present invention.

EXAMPLES OF THE PRESENT INVENTION

In one example, a method embodied by the alternate logic software library software instructions to modify the Dalvik Virtual Machine logical data values involves using Dalvik provided software lookup methods to gain access to a "Method object" that represents a target software function/method intended for modification. A "Method object" is a software logical construct that represents the software values used to perform the operations of that function/method. Implementation examples of a "Method object" lookup include:

```
import java.lang.reflect.Method;
public Method lookupMethod( Object targetObject,
String methodName, Class[ ] parameters ){
    return obj.getClass( ).getMethod(methodName, parameters);
}
Method* DVMAdapter::methodFromJni(jobject jmethod)
{
    Object* method = dvmDecodeIndirectRef(getCurrentThread( ),
jmethod);
    Method* m = dvmGetMethodFromReflectObj(method);
    return m;
}
/*
    The following "struct Method" code is included for example
    reference purposes, and bears the following copyright information:
*
* Copyright (C) 2008 The Android Open Source Project
*
* Licensed under the Apache License, Version 2.0 (the "License");
* you may not use this file except in compliance with the License.
* You may obtain a copy of the License at the web site of Appache.
*
*
* Unless required by applicable law or agreed to in writing, software
* distributed under the License is distributed on an "AS IS" BASIS,
* WITHOUT WARRANTIES OR CONDITIONS OF ANY KIND,
either express or implied
* See the License for the specific language governing permissions
* and limitations under the License.
*/
struct Method {
    ClassObject* clazz;
    u4 accessFlags;
    u2 methodindex;
    u2 registersSize;
    u2 outsSize;
    u2 insSize;
    const char* name;
    DexProto prototype;
    const char* shorty;
    const u2* insns;
    int jniArgInfo;
    DalvikBridgeFunc nativeFunc;
    bool fastJni;
    bool noRef;
    bool shouldTrace;
    const RegisterMap* registerMap;
    bool inProfile;
};
--
```

In various embodiments, the alternate logic software library software instructions will then change the value of the "insns" field of the "Method object" to a different value. The value of the "insns" field represents a reference to a set of logical software instructions to execute when that function/method is invoked. By changing the value of the "insns" field, alternate logical software instructions can be referenced/used. The purpose and nature of those instructions is arbitrary, but in various embodiments they serve the goal to change the behavior of the particular method/function associated with that "Method object". In various embodiments, the new value used for the "insns" field can be included within the library software instructions, specified by policy meta-data, or the like. An implementation example could look like:

bool DVMHook::modify(Method* methodObject, u2* newOperations){
        methodObject->insns=newOperations;
    }

In some embodiments, the alternate logic software library software instructions can create a copy of the "insns" field of the "Method object" and store the copy in a persistent or non-persistent storage medium, for backup purposes. Later, the alternate logic software library software can restore original "Method object" "insns" field by copying the stored contents back to the "insns" field. In some embodiments, the alternate logic software library software instructions creates a new "Method object", or look up another "Method object", and copy the contents of the original "Method object" "insns" field to the new "Method object" for backup purposes. Later, the alternate logic software library software can restore original "Method object" "insns" field by copying the contents of the backup "Method object" "insns" field to the original "Method object" "insns" field. Accordingly, in such embodiments, the original state of the mobile application software instructions can be restored. An example of this is:

bool DVMHook::modify(Method* methodObject, u2* newOperations, Object* backupObject){
        Method*
            methodBackup=dvmGetMethodFromReflectObj
            (backupObject);
        methodBackup->insns=methodObject->insns;
        methodObject->insns=newOperations;
    }

In another embodiment, a method used by the alternate-logic-software-library software instructions to modify the Dalvik Virtual Machine logical data values involves using Dalvik provided software lookup methods to gain access to a "Method object" that represents a target software function/method intended for modification, setting the "native code" logical software value within the "accessFlags" field of the "Method object", and setting a reference (a "pointer") within the "nativeFunc" field of the "Method object". In various embodiments, the reference pointer value will reference another set of software instructions contained in the alternate logic software library. In this example, by setting the "nativeFunc" field with a reference to alternate logic software library software instructions, and setting the "accessFlags" to indicate "native code", the Dalvik Virtual Machine will ignore the "insns" field in the "Method object" and instead execute the software instructions referenced by the "nativeFunc" field. When called, the alternate-logic-software-library software instructions referenced by the "nativeFunc" field will then perform the alternate behavior operations. As mentioned above, the nature of the alternate behavior operations can be directed by policy meta-data. An example implementation could look like:

```
bool DVMHook::modify(Method* methodObject, const dispatcher_t dispatcher){
    methodObject->accessFlags |=ACC_NATIVE;
    methodObject->nativeFunc = dispatcher;
}
void dispatcher(const uint32_t* args, JValue* pResult, const Method* method, struct Thread* self)
{
    const char *desc = &(method->shorty[1]);
    char ret = method->shorty[0];
    args = ((uint32_t*)self->interpSave.curFrame) +
    (method->registersSize - method->insSize);
    Object* thisObj = NULL;
    DVMMethod inMethod((Method*)method);
    if( inMethod.checkAccessFlags( ACC_STATIC ) &&
    !outMethod.checkAccessFlags( ACC_STATIC ) ){
        thisObj = (Object*) (unsigned long) args[0];
        args++;
    }
    // Perform arbitrary alternate operations
    *pResult = operationsResult;
    return;
}
```

In some embodiments, variants to the previously described method involves the alternate-logic-software-library software instructions modifying the Dalvik Virtual Machine logical data values using Dalvik provided software lookup methods to gain access to a "Method object" that represents a target software function/method intended for modification, that represents a target software function/method intended for backup, that represents an alternate software function/method intended for alternate software operation, or the like. Various embodiments may also include one or more of the following operations: copying the data that specifies the original target "Method object" to the "insns" field of a backup "Method object", providing a new value for the "insns" field of the original target "Method object" a "pointer" to the alternate "Method Object", setting the "native code" logical software value within the "accessFlags" field of the original target "Method object", setting the "native code" logical software value within the "accessFlags" field of the backup "Method object", setting a reference ("pointer") within the "nativeFunc" field of the original target "Method object" to reference another set of software instructions contained in the alternate logic software library, setting a reference ("pointer") within the "nativeFunc" field of the backup "Method object" to reference another set of software instructions contained in the alternate logic software library, or the like.

In various embodiments, upon invocation of the original target method, the "nativeFunc" field and "accessFlags" fields will direct the Dalvik Virtual Machine to execute the alternate logic software library software operations. The alternate logic software library software operations will then access the "insns" field of the original target "Method object" and process the operation meta-data stored there previously. In this implementation, the operation meta-data is a reference to another "Method object" that can then be executed (known as "invoked" in the industry). In other embodiments, the operation meta-data includes software logical values that represent persistent and non-persistent data related to how to perform the current behavioral modification, a reference to the backup "Method object", etc.

In various embodiments, the alternate logic software library software operations can: perform arbitrary, alternate software operations and then return data results and execution control to the mobile software application, with the return data results and alternate software operations optionally specified by or guided by the policy meta-data or the operation meta-data; redirect the execution control to another set of software applications, the redirection optionally specified by or guided by the policy meta-data or the operation meta-data; or the like In various embodiments, execution of the original software instructions represented by the original target "Method object" is achieved by the alternate-logic-software-library software instructions transferring control to software method referenced by the backup "Method object." An example implementation could look like:

```
bool DVMHook::modify(Method* methodObject, const
dispatcher_t dispatcher, Method* alternateMethod,
Method* backupMethod){
    memcpy( backupMethod->insns, methodObject, sizeof(Method) );
    backupMethod->accessFlags |=ACC_NATIVE;
    backupMethod->nativeFunc = dispatcher;
    methodObject->accessFlags |= ACC_NATIVE;
    methodObject->nativeFunc = dispatcher;
    methodObject->insns = (u2*)alternateMethod;
}
void dispatcher(const uint32_t* args, JValue* pResult, const
Method* method, struct Thread* self)
{
    const char *desc = &(method->shorty[1]);
    char ret = method->shorty[0];
    args = ((uint32_t*)self->interpSave.curFrame) +
(method->registersSize - method->insSize);
    Object* thisObj = NULL;
    JValue invokeResult;
    DVMMethod inMethod((Method*)method);
    DVMMethod outMethod((Method*)inMethod.getInsns( ));
    if( inMethod.checkAccessFlags( ACC_STATIC) &&
!outMethod.checkAccessFlags( ACC_STATIC ) ){
        thisObj = (Object*) (unsigned long) args[0];
        args++;
    }
    DVMAdapter::invoke(self, outMethod.getPtr( ),
thisObj, &invokeResult, args);
    *pResult = invokeResult;
    return;
}
void
DVMAdapter::invoke (Thread * self, const Method * method,
       Object * obj, JValue * pResult, const u4 * args)
{
    bool fromJni = false;
    const char *desc = &(method->shorty[1]);
    int verifyCount = 0;
    jvalue *ins = (jvalue *) malloc (sizeof (jvalue) * strlen (desc));
    jvalue *argument = ins;
    while (*desc != '\0')
    {
    switch (*desc++){
        case 'D':
        case 'J':
            memcpy (ins, args, 8);
            args += 1;
            verifyCount++;
            break;
        case 'I':
            ins->i = *args;
            break;
        case 'C':
            ins->c = *args;
            break;
        case 'B':
            ins->b = *args;
            break;
        case 'Z':
            ins->z = *args;
            break;
        default:
            abort( );
            goto cleanup;
    }
    verifyCount++;
    args++;
    ins++;
}
```

```
    dvmCallMethodA (self, method, obj, fromJni, pResult, argument);
cleanup:
    free (argument);
    return;
}
```

One example usage of this invention may be to disallow a mobile software application access to specific software or mobile device hardware functionality. For example, a "Policy" (Corporate Policy, Parental Policy, etc.) can contain data that instructs the alternate logic software library to temporarily disallow access to the mobile software application to take photographic pictures using the mobile device camera from within the mobile software application. In particular, upon (modified) mobile software application start up, execution will transfer to the alternate logic software library instructions. Those instructions will look up the Android "android.hardware.Camera" software class method named "takePicture". A lookup of the "android.hardware.Camera.takePicture" method will be performed, to retrieve a Method object for "android.hardware.Camera.takePicture". The alternate logic software library instructions will then perform a modification to the "takePicture" method object to set the "ACC_NATIVE" flag on the "accessFlags" field, and set the "NativeFunc" field to reference alternate software operation instructions in the alternate logic software library. The alternate software operation instructions referenced by the "NativeFunc" field can return an error code (known as an "Exception" in the industry) to indicate the functionality is not available. Alternatively, the alternate software operation instructions referenced by the "NativeFunc" field can immediately return a logical value that represents the "takePicture" operation was successful, however no actual camera operation was performed. The alternate logic software library then transfers control back to the mobile application software. Subsequently, whenever the mobile application attempts to take a photograph using the "android.hardware.Camera.takePicture" logical software method, the alternate software instructions in the alternate logic software library will receive execution control and return execution back to the mobile software application, thus preventing the mobile software application from taking photographs. At a later time, software library can determine (through various methods, not included in the present disclosure) there is a "Policy" change to allow the mobile software application access to take pictures with the camera once again. The alternate logic software library will then lookup the "android.hardware.Camera.takePicture" method object, remove the reference in the "NativeFunc" field, and remove the "ACC_NATIVE" flag on the "accessFlags" field. This results in any subsequent invocations by the mobile software application to the "android.hardware.Camera.takePicture" method to succeed/operate as normal, thus allowing the mobile application to take photographs.

Another example of embodiments of the present invention would be to modify data passed from or to the mobile software application by software methods. In various embodiments, a "Policy" can contain data that instructs the software library to transform the data value typically returned by invocations to the "android.os.Build.getRadioVersion" logical software method. For example, the transformation could specify adding the value "–EXTRA" to the end of the existing, typical returned value. In operation, upon (modified) mobile software application start up, execution will transfer to the alternate logic software library instructions. As an example, those instructions will look up the Android "android.os.Build" software class method named "getRadioVersion". A lookup of the "android.os.Build.getRadioVersion" method will be performed, to retrieve a Method object for "android.os.Build.getRadioVersion". The alternate logic software library will also include an alternate method for the original "getRadioVersion"; an example implementation would look like:

```
public static String alternate_getRadioVersion( ){
    // call the original get_RadioVersion
    String
        result=android.os.Build.original_getRadioVersion(
        );
    // append our extra data
    result=result+"–EXTRA";
    // return our transformed result
    return result;
}
```

In various embodiments, a lookup of the "alternate_getRadioVersion" method will be performed, to retrieve a Method object for "alternate_getRadioVersion". A new method will be created, named "_original_getRadioVersion", and a Method object will be retrieved for that method. The alternate logic software library instructions will then copy the data of the Method object for the original "getRadioVersion" to the "Insns" field of the "_original_getRadioVersion" Method object, change the "Insns" field of the "getRadioVersion" Method object to reference the "alternate_getRadioVersion" Method object, set the "ACC_NATIVE" flag on the "accessFlags" field of the "getRadioVersion" Method object, set the "ACC_NATIVE" flag on the "accessFlags" field of the "_original_getRadioVersion" Method object, set the "NativeFunc" field of the "getRadioVersion" Method object to point to a "dispatcher" set of software instructions in the alternate logic software library, and set the "NativeFunc" field of the "_original_getRadioVersion" Method object to point to a "dispatcher" set of software instructions in the alternate logic software library. Such actions effectively creates a backup of the original "getRadioVersion" to the new method name "_original_getRadioVersion", and substitutes the "alternate_getRadioVersion" in place of the original "getRadioVersion". Subseqently, an invocation of the "_original_getRadioVersion" or "getRadioVersion" will result in transferring execution control to a "dispatcher" set of software instructions in the alternate logic software library. The "dispatcher" contains instructions that cause it to retrieve the Method object "Insns" field referenced by the currently invoked method object, and then invoke the referenced method. Thus when a mobile software application executes the "android.os.Build.getRadioVersion" method, control will transfer to the "dispatcher" in the software library (due to the "ACC_NATIVE" flag set on the "accessFlags" field and a "NativeFunc" field value set on the "getRadioVersion" Method object). The dispatcher will retrieve the "Insns" field of the current method object (in this case, the "getRadioVersion" Method object); the "Insns" field is actually a reference/pointer to the "alternate_getRadioVersion" Method object. The "dispatcher" will then invoke the method object referenced by the "Insns" field (in this case, the "alternate_getRadioVersion" method). This causes execution control to be transferred to the "alternate_getRadioVersion" software instructions.

The previous example implementation for "alternate_getRadioVersion" has an invocation to the "_original_getRadioVersion". Then an invocation to "_original_getRadioVersion" occurs, control will transfer to the "dispatcher" in the software library (due to the "ACC_NATIVE" flag set on the "accessFlags" field and a "NativeFunc" field value set on the "_original_getRadioVersion" Method object). The dispatcher will retrieve the "Insns" field of the current method object (in this case, the "_original_getRadioVersion" Method object); the "Insns" field is actually a reference/pointer to the original "getRadioVersion" Method object. The "dispatcher" will then invoke the method object referenced by the "Insns" field (in this case, the original "getRadioVersion" method). This causes execution control to be transferred to the "getRadioVersion" software instructions. Those software instructions perform their original operation, which in this case leads to a String data value being returned. The software library receives the returned data value from the original "getRadioVersion" method, and returns the data value to the "alternate_getRadioVersion" as a return result for the "_original_getRadioVersion" invocation. The "alternate_getRadioVersion" transforms the result value by appending additional data to the String value (as directed by the "Policy"), and then returns the transformed value. Upon return of "alternate_getRadioVersion", execution control transfers back to the "dispatcher", where the return value of "alternate_getRadioVersion" (which is the transformed data) is then returned to the mobile software application as the final return result for the mobile software applications initial invocation of "getRadioVersion". In such embodiments, the end result is the mobile software application made a call to "android.os.Build.getRadioVersion", and through the use of above-described example, an alternate set of software operations were put in place (directed by a "Policy"), and the alternate set of software operations may still utilize the original set of software operations. This allows transparent modification of the mobile software application behavior.

Further example are provided herein. Referencing the previous example, the original "getRadioVersion" method, "alternate_getRadioVersion" method, and "_original_getRadioVersion" method could be implemented in a manner to receive additional data at the time of execution transferring control, known in the industry as "function parameters" or "method parameters". The application would pass parameter data to "getRadioVersion", and as previously described, and the dispatcher would invoke "alternate_getRadioVersion" with the same parameter data. The software logic embodied in the "alternate_getRadioVersion", optionally under the direction of a "Policy", can substitute a different data value to use as a data parameter to the "_original_getRadioVersion" invocation. This allows the invention to arbitrarily transform, modify, or substitute data being sent to an invoked method, whereas the previous example illustrates the arbitrary transformation of data being returned by an invoked method.

Referring to the previous example, the original "getRadioVersion" method, "alternate_getRadioVersion" method, and "_original_getRadioVersion" method could be implemented to monitor or record application behavior. The application would invoke the "getRadioVersion" method, and as previously described, the dispatcher would invoke "alternate_getRadioVersion". The "alternate_getRadioVersion" method would record data to a memory medium indicating the invocation of the "getRadioVersion" method and any present method parameter data. The "alternate_getRadioVersion" method would proceed to invoke the "_original_getRadioVersion" method. This allows the invention to arbitrarily monitor or record method invocation and method invocation parameters. In some embodiments, the dispatcher would record data to a memory medium indicating the invocation of the "getRadioVersion" method and any present method parameter data. The dispatcher then may directly call "_original_getRadioVersion" method.

Some embodiments of the present invention have the capability of altering the logical software operation/behavior of software "methods" contained within the mobile application itself, or contained in supporting software modules external to the application (called the "framework" or "libraries" in the industry). In some embodiments, virtually any "method" capable of invocation anywhere within logical software, be it a part of the mobile software application or external to the mobile software application, executing within the Android Dalvik Virtual Machine, can be subject to behavior/operation modification.

To aid in the understanding of the present invention a summary of various aspects is here provided, it will be understood that this listing is meant to provide insight into some aspects of the invention and is not meant as a full listing or to limit the scope of the invention to the following:

- A target software application consisting of a plurality of machine instructions, executing on a computing device consisting of one or more central processing units, and memory medium, with that computing device executing the Android operating system. Herein defined a method to change the executed operation of the target software application by the following steps: creation of a software library containing a plurality of logical software instructions, modification of the target software application to load the software library, execution of the target software application leads to execution of the logical software instructions of the software library, the software library performs modifications to the Android Dalvik Virtual Machine operational data to substitute alternate logical software operations, causing the target software application to execute and act upon the result of the alternate logical software operations, thus modifying the mobile software application's logical behavior.
  - Where the software library containing a plurality of logical software instructions contains instructions that execute directly on the central processing unit, known in the industry as a "native code library"
  - Where modification of target software application to load the software library consists of: performing a transformation on the target software application logical instructions to cause the instructions, when executed, to transfer control to the software library
    - Where the modification process can occur: on the mobile device, or on an external system prior to the mobile software application being transferred to the mobile device
    - An example method of performing a transformation on the target software application consists of: performing an enumeration of the mobile software application points of execution start, and for each identified point of execution start: modifying the mobile software application instructions at that point of execution start to cause an execution of software instructions in the software library. Enumeration of the mobile software application points consists of: parsing the Android application "AndroidManifest.xml", identifying all entry "Activities", "BroadcastReceivers", "ContentProviders", and "Services", identifying all software instruction code locations for previously identified Activities, BroadcastReceivers, and Services, and modifying the software instructions at the identified software instruction code locations.
    - An example method of performing a transformation on the target software application consists of: parsing the Android application "Android Manifest.xml" to identify the "android:name" value of the "application" XML element. If the "android:name" value exists and contains a valid value, then the software instruction code location referenced by the "android:name" value is modified to cause the execution of software instructions in the software library. If the "android:name" value does not exist or does not contain a valid value, then a new software code location is created that contains software instructions to cause the execution of software instructions in the software library, the reference value to the new software code location is copied into the "android:name" value, and the modified "AndroidManifest.xml" is substituted for the original "AndroidManifest.xml".
  - Where the software library performs modifications to the Android Dalvik Virtual Machine operational data consists of retrieving a logical reference, known as a "Pointer" in the industry, to a logical software instruction set, known as a "Method Object" in the industry, and changing the "Insns Field" of the Method Object to reference an alternate set of software instructions.
    - The method of the previous point, whereby the alternate set of software instructions are defined by a set of data, named the "Behavior Policy" or "Policy", where the Policy can be a set of data that is: copied from a remote network location to the local mobile device, be included in partial or entirety in the software library, or be located in a local persistent storage medium.
    - The method of the previous point, where the original value of the Insns Field of the Method Object is copied to a persistent or non-persistent storage medium. The original value, at a later time, can be referenced, executed, or copied to the Insns Field of the original Method Object in order to perform or restore the original software behavior.
  - Where the software library performs modifications to the Android Dalvik Virtual Machine operational data consists of retrieving a logical reference, known as a "Pointer" in the industry, to a logical software instruction set, known as a "Method Object" in the industry, and changing the "NativeFunc Field" of the Method Object to reference an alternative set of instructions in the software library, and changing the "AccessFlags Field" of the Method Object to include the "ACC_NATIVE" logical software value.
    - The method of the previous point, whereby the alternate set of software instructions perform operations that are defined by a set of data, named the "Behavior Policy" or "Policy", where the Policy can be a set of data that is: copied from a remote network location to the local mobile device, be included in partial or entirety in the software library, or be located in a local persistent storage medium.
    - Furthering the method of the previous point, the software library additionally retrieves a logical reference, known as a "Pointer" in the industry, to a secondary logical software instruction set, known as the "Backup Method Object", copies the original Method Object Insns Field to the Backup Method Object Insns Field, constructs "Operation Meta-Data", and copies the Operation Meta-Data to the Method Object Insns Field. The software operations in the software library referenced by the NativeFunc Field of the Method Object embody operations that access the Method Object Insns Field, and use the Operation Meta-Data to determine the subsequent alternate set of software instructions to execute. The Operation Meta-Data can contain: a reference to the Backup Method Object.

Furthering the method of the previous point, the software library additionally copies the original Method Object Insns Field to a persistent or non-persistent storage. The software operations in the software library referenced by the NativeFunc Field of the Method Object embody operations that access the persistent or non-persistent storage to access the original Method Object Insns Field value, and use the original Method Object Insns Field value to determine the subsequent alternate set of software instructions to execute.

Furthering the method of the previous point, the software library: additionally retrieves a logical reference, known as a "Pointer" in the industry, to a secondary logical software instruction set, known as the "Backup Method Object"; the software library additionally retrieves a logical reference, known as a "Pointer" in the industry, to an alternate logical software instruction set, known as the "Alternate Method Object"; copies the data embodying the original Method Object to the Backup Method Object Insns Field; sets the original Method Object Insns Field value to a reference, known as a "Pointer" in the industry, to the Alternate Method Object; changes the NativeFunc Field of the Backup Method Object to reference an alternative set of instructions in the software library; changing the "AccessFlags Field" of the Backup Method Object to include the "ACC_NATIVE" logical software value. The software operations in the software library referenced by the NativeFunc Field of the Method Object and the NativeFunc Field of the Backup Method Object embody operations that access the Insns Field of the currently executed (known as "invoked" in the industry) method object, use the method object referenced by the Insns Field to determine an alternate method to execute (known as "invoke" in the industry), execute/invoke the alternate method software instructions, receive a result from the alternate method software instructions, and return the result to the mobile software application instruction that executed/invoked the method represented by the original Method Object.

What is claimed is:

1. A computer-implemented method for modifying execution of a software application on a mobile computing device programmed to perform the method comprises the steps of:
   receiving in the mobile computing device, the software application, wherein the software application comprises a plurality of logical software instructions;
   receiving in the mobile computing device, a software library comprising plurality of modified logical software instructions;
   initiating in the mobile computing device, execution of the software application including modifying reference from the plurality of logical software instructions to refer to the plurality of modified logical software instructions; including the steps of:
      determining in the mobile computing device, a pointer to a NativeFunc field in a Method Object in a virtual machine;
      modifying in the mobile computing device, the pointer to point to the software library;
      determining in the mobile computing device, a pointer to an AccessFlags field in a Method Object in a virtual machine; and
      modifying in the mobile computing device, the pointer to include the ACC_NATIVE logical value;
   inhibiting in the mobile computing device, execution of the plurality of logical software instructions; and
   initiating in the mobile computing device, execution of the plurality of modified logical software instructions.

2. The method of claim 1 further comprising the steps of:
   determining in the mobile computing device, a pointer to an Insns field in a Method Object in a virtual machine;
   constructing in the mobile computing device, a second Method Object;
   copying in the mobile computing device, the pointer of the Insns field of the Method Object to the second Method Object; and
   modifying in the mobile computing device, the pointer to the Insns field.

3. The method of claim 1 wherein the software library instructions perform operations specified by a behavior policy.

4. A mobile computing device for modifying execution of a software application comprising:
   a memory configured to store a software application, wherein the software application comprises a plurality of logical software instructions, and wherein the memory is configured to store a software library comprising a plurality of modified logical software instructions;
   a processor coupled to the memory, wherein the processor is programmed to initiating execution of the software application and act to modify references from the plurality of logical software instructions to refer to the plurality of modified logical software instructions including determining in the mobile computing device, a pointer to a NativeFunc field in a Method Object in a virtual machine; modifying in the mobile computing device, the pointer to point to the software library; determining in the mobile computing device, a pointer to an AccessFlags field in a Method Object in a virtual machine; and modifying in the mobile computing device, the pointer to include the ACC_NATIVE logical value; wherein the processor is programmed to inhibiting execution of the plurality of logical software instructions when executing the software application, and wherein the processor is programmed to initiating execution of the plurality of modified logical software instructions when executing the software application.

5. The method of claim 1, wherein the method further comprises modifying in the mobile computing device, a virtual machine to refer to the plurality of modified logical software instructions.

6. The method of claim 5 wherein the virtual machine comprises an Android Dalvik Virtual Machine.

7. The method of claim 1 wherein the software library comprising a plurality of modified logical software instructions further comprises a native code library.

8. The method of claim 1 wherein modifying in the mobile computing device, reference from the plurality of logical software instructions to the plurality of modified logical software instructions comprises the steps of:
   determining in the mobile computing device, a pointer to an Insns field in a Method Object in a virtual machine; and
   modifying in the mobile computing device, the pointer to point to the software library.

* * * * *